United States Patent [19]

Quentin

[11] 4,087,391

[45] May 2, 1978

[54] ION-EXCHANGER ALKYLSULPHONATED PHENOXY POLYMERS FOR MEMBRANES

[75] Inventor: Jean-Pierre Quentin, Lyon, France

[73] Assignee: Rhone-Poulenc Industries, Paris, France

[21] Appl. No.: 730,989

[22] Filed: Oct. 8, 1976

[30] Foreign Application Priority Data

Oct. 15, 1975 France ............................. 75 32226
Jun. 11, 1976 France ............................. 76 18864

[51] Int. Cl.² ......................................... B01D 13/00
[52] U.S. Cl. ............................. 260/2.2 R; 204/180 P; 204/296; 210/490; 210/500 M; 260/47 EP; 260/47 R; 260/79.3 R
[58] Field of Search ................. 260/79.5 NV, 79.3 R, 260/2.2 R, 47 EP; 204/180 P, 195 P, 296; 526/30; 210/500 M, 490 M

[56] References Cited

U.S. PATENT DOCUMENTS

| | | | |
|---|---|---|---|
| 3,709,841 | 4/1970 | Quentin | 260/2.2 R |
| 3,751,376 | 8/1973 | Quentin | 260/47 EP |
| 3,855,122 | 12/1974 | Bowgood | 260/2.2 R |

FOREIGN PATENT DOCUMENTS

1,584,814  1/1970  France ..................... 260/79.5 NV

*Primary Examiner*—Joseph L. Schofer
*Assistant Examiner*—Peter F. Kulkosky
*Attorney, Agent, or Firm*—Stevens, Davis, Miller & Mosher

[57] ABSTRACT

A polymer is disclosed having ion exchange properties, and characterized by the presence of units of the formula:

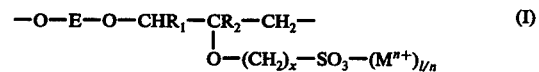

(I)

optionally associated with units of the formula:

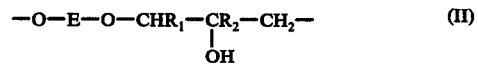

(II)

in which:
  $R_1$ and $R_2$, which may be identical or different, represent a hydrogen atom or a methyl radical;
  E represents a divalent radical consisting of the nucleus system of a polynuclear diphenol in which the hydroxyl group are attached to different nuclei;
  $x$ and $n$ are positive integers; and
  $M^{n+}$ represents a cation of valency $n$.

29 Claims, No Drawings

ION-EXCHANGER ALKYLSULPHONATED PHENOXY POLYMERS FOR MEMBRANES

The units of formula (I) are present in the polymer to the extent of from 0.5 to 3 millieqivalents per gram (meq/g) of dry resin. E may have the formula:

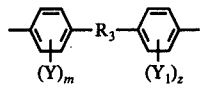

in which

Y and $Y_1$ are alkyl or alkoxy radicals having from 1 to 4 carbon atoms, or halogen atoms;

$R_3$ represents —CO—, —$SO_2$—, —O—, or —S—, or an alkylene or alkylidene radical having from 1 to 3 carbon atoms;

m and z may be equal to 0, 1, 2 or 3;

$M^{n+}$ represents $H^+$ or $Na^+$, $K^+$, $Li^+$, $Mg^{++}$, $Ba^{++}$, $Na_4^+$ or another ammonium cation; and x is between 2 and 5.

The polymer may be crosslinked, and contain units of the formula (IV).

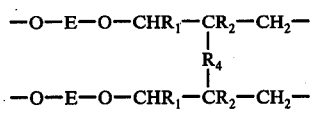

in which $R_4$ represents a radical such as —O— or —O—$R_5$—O; $R_5$ being an organic radical of valency at least equal to 2; and E, $R_1$ and $R_2$ being as defined in claim 1.

The polymer is in the form of a membrane such as an ion exchange membrane, a composite membrane, a screen-reinforced membrane, or an anisotropic membrane, and is treated by immersion in an acid solution containing ceric ions derived from ceric nitrate or sulphate. The membrane is especially useful in electrolysis cells and in reverse osmosis.

The present invention relates to new polymers which have ion exchange properties and which permit the production of semi-permeable membranes or selective diaphragms.

These new polymers are characterised by the presence of units of the formula:

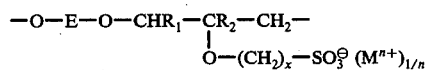

optionally associated with units of the formula:

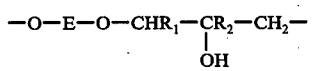

in which:

$R_1$ and $R_2$, which may be identical or different, represent a hydrogen atom or a methyl radical, E represents a divalent radical consisting of the nucleus system of a polynuclear diphenol (of the formula HO—E—OH), in which the hydroxyl groups are attached to different nuclei, x and n are positive integers and $M^{n+}$ represents a cation of valency n.

The new polymers of this invention are such that, in general, the units of formula (I) are present in the polymer to the extent of from 0.5 to 3 milliequivalents per gram (meq/g) of dry resin, and preferably to the extent of from 1 to 1.5 meq/g.

The divalent radical E preferably has the formula:

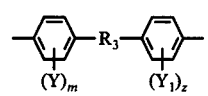

in which Y and $Y_1$ are alkyl or alkoxy radicals having from 1 to 4 carbon atoms, or halogen atoms, $R_3$ is an alkylene or alkylidene radical having from 1 to 3 carbon atoms, such as the methylene, ethylene, propane-1,3-diyl and propane-2,2-diyl radicals, and wherein $R_3$ may also represent a divalent non-hydrocarbon radical such as —CO—, —$SO_2$—, —O— or —S—, and m and z may be equal to 0, 1, 2 or 3, and preferably 0, 1 or 2.

The nature of the cation $M^{n+}$ is not critical. Furthermore, the cation $M^{n+}$ may be changed by the usual ion-exchange methods, especially in the course of using the polymers according to this invention, without thereby fundamentally changing the nature and the properties of the said polymers. In the more usual forms of the said polymers, $M^{n+}$ represent $H^+$ or a cation selected from the class consisting of cations derived from the alkali metals or alkaline earth metals, especially $Na^+$, $K^+$, $Li^+$, $Mg^{++}$ and $Ba^{++}$, as well as $NH_4^+$ and other ammonium cations.

x is generally at most equal to 10, and preferably between 2 and 5.

The present invention also relates to new crosslinked copolymers formed from the units indicated above plus units of the formula (IV):

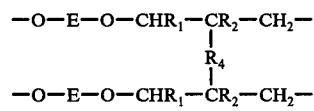

in which $R^4$ represents a radical such as —O— or —O—$R_5$—O, $R_5$ being an organic radical of valency at least equal to 2.

Suitable radicals $R_5$ which may be mentioned are

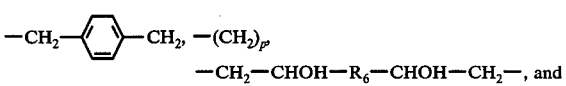

—$CH_2$—CHOH—$R_6$—$CH_2$—, $R_6$ being a valency bond or an aliphatic or aromatic hydrocarbon radical such as

p generally being less than 10. Other meanings of $R_6$ will be given later.

The units (IV) are attached to the other units which constitute the polymers of this invention in such a way that $R_4$ simply constitutes a crosslinking bridge between the various macromolecular chains and in such a way that the terminal methylene groups of the units (IV) are attached to an oxygen atom of another unit (I), (II) or (IV).

The present invenition also relates to a process for the preparation of the copolymers defined above. According to this process, the copolymers according to the invention are prepared by reaction of sultones or of salts of halogenoalkylsulphonic acids with polymers consisting of units of the formula (II), referred to, in the text which follows, as "phenoxy resin"; the copolymers thus obtained, according to the invention, are designated by the expression "alkylsulphonated phenoxy resins", or sometimes by the expression "sulphoalkylated resins".

The phenoxy resins which may be used are per se wellknown products. They are generally obtained by condensation (preferably in solution), in an alkaline medium, of a bis-phenol (HO—E—OH) with epichlorohydrin or, more generally, with an epihalogenohydrin which is optionally substituted by groups such as $R_1$ and $R_2$ defined as above. The phenoxy resins are of a broadly related chemical nature to the so-called epoxy resins, but as they are synthesised from approximately stoichiometric amounts of bis-phenol and epihalogenohydrin they have a higher molecular weight and the chain ends have little influence. In practice, their molecular weight is usually such that their reduced viscosity (measured at 25° C in dimethylformamide, at a concentration of 2 g/l) is preferably between 15 and 120 cm³/g.

The sultones and salts of halogenoalkylsulphonic acids and their derivatives will hereinafter be referred to as the alkylsulphonating agent.

The sultones which can be used have the formula:

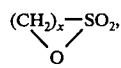

$x$ being equal to or greater than 2, and preferably equal to or greater than 3. As sultones of this type there may be mentioned propane-sultone, butane-sultone and pentane-sultone.

The halogenoalkylsulphonic acids (of which the salts can be used in the invention) have the formula X — $(CH_2)_x$ — $SO_3H$, X being a halogen atom, preferably chlorine or bromine, and $x$ being a positive integer. halogenoalkylsulphonic acids which are particularly useful are chloromethylsulphonic, bromomethylsulphonic, 2-chloroethylsulphonic, 2-bromoethylsulphonic, 3-chloropropylsulphonic and 3-bromopropylsulphonic acid.

The salts of the halogenoalkylsulphonic acids are more particularly the alkali metal or alkaline earth metal salts, and preferably the sodium salts or potassium salts.

The reaction of the sultone or of the halogenoalkylsulphonic acid salt is advantageously carried out in a solvent for the phenoxy resin and in the presence of a strong base.

As the solvent for the phenoxy resin, it is advantageous to use an aprotic polar solvent, for example dimethylsulphoxide, hexamethylenephosphotriamide, dimethylacetamide or dimethylformamide.

As the strong base, it is advantageous to use metal derivatives (preferably alkali metal derivatives) of compounds having a mobile hydrogen, for example the alcoholates, hydroxides and hydrides and the compounds called dimethylsulphinyl compounds. The sodium derivatives are the preferred metal derivatives. The ethylate or the tertiary butylate is advantageously used as the alocholate. Sodium hydroxide may be used as the hydroxide. Dimethylsulphinyl-sodium is formed by the reaction of sodium hydride with dimethylsulphoxide (forming $CH_3$—$SO_2$—$CH_2$—$Na^+$). The strong base may thus give rise to interactions, or even reactions, with the solvent.

The strong base is used in such amount that the molar ratio of base/alkylsulphonating agent is between 0.5 and 2, and preferably between 0.9 and 1.1, the optimum being the stoichiometric ratio.

The alkylsulphonating agent is used in such amount that the ratio of the number of mols of alkylsulphonating agent/units of formula (II) present in the reactive copolymer starting material is between 0.05 and 5, and preferably between 0.2 and 2.

The concentration of polymer in the reaction medium generally varies between 0.5 and 20% by weight, and preferably between 1.5 and 5%.

The reaction temperature is such that the reaction medium is liquid. In general, it is below 100° C and preferably between 30° and 70° C.

The units of the formula (IV) (of which the numerical ratio thereof to the units (I) and (II) may be zero but is generally between 0.1 and 20% if there is crosslinking) are obtained either by thermal crosslinking ($R_4$ = —O—) or by the action of a difunctional crosslinking agent capable of reacting with the OH groups of the base polymer; this may be a dihalogenated crosslinking agent or a diepoxide crosslinking agent or a mixed compound (epichlorohydrin); the reactions which may take place are thus of the following types:

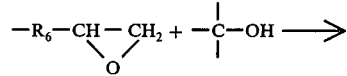

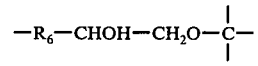

As diepoxides which may be used in crosslinking there may be mentioned compounds of the formula:

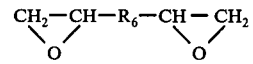

in which $R_6$ represents an aliphatic or aromatic or cycloaliphatic divalent radical or a mixed divalent radical (wherein at least two of these aliphatic, aromatic or cycloaliphatic characteristics are combined); $R_6$ may also contain substituents and its carbon chain may optionally be interrupted by functional groups, for example ether bridges (an oxygen atom).

Preferably, $R_6$ contains from 2 to 100 carbon atoms. More specific diepoxides which may be mentioned are the glycidyl ether

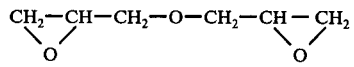

as well as the polycondensates resulting from the reaction of bisphenol A with an excess of epichlorohydrin (if the reaction takes place under approximately stoichiometric conditions, the phenoxy resin is formed). These polycondensates have the formula (V)

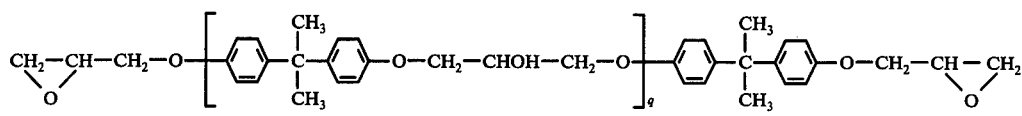

in which $q$ is an integer but may also be a fraction if the formula (V) represents an average formula.

If the alkylsulphonated phenoxy resins are crosslinked by diepoxides, they contain units of the formula (IV), in which $R_4$ represents a $-CH_2-CHOH-R_6-CHOH-CH_2-$ group, $R_6$ having the meanings given above.

The crosslinking reaction of alkylsulphonated phenoxy resins by means of epoxides may be carried out simply by heat treatment of a mixture of diepoxide and alkylsulphonated phenoxy resin but it is possible to catalyse the reaction, for example by alkaline agents such as alkali metal hydroxides (e.g., sodium hydroxide).

PREPARATION OF THE MEMBRANES

According to a convenient and preferred process for producing membranes of alkylsulphonated phenoxy resin crosslinked by means of a diepoxide, a solution which contains both the alkylsulphonated phenoxy resin and a diepoxide is prepared. The solution is cast and, if appropriate, is coagulated and/or evaporated so as to form a film, and this film is then immersed in a solution of a catalyst for the reaction of the epoxide groups with the hydroxyl groups, after which it is withdrawn from this solution and heat-treated (generally at between 50° and 150° C). The diepoxide is generally used in such amount that the ratio $$\frac{\text{number of epoxide groups}}{\text{number of hydroxyl groups of the alkylsulphonated phenoxy resin}}$$

is between 0.5 and 2.

Finally, this invention relates to improved membranes, and in particular to membranes having a reduced permeability to hydroxyl ions. Such membranes are obtained, according to the invention, by immersing membranes such as those prepared above (and preferably the membranes of alkylsulphonated phenoxy resins crosslinked by diepoxides) in a solution containing ceric ions ($Ce^{++++}$). The membranes treated in this way are advantageously screen-reinforced. They may be dense or composite. The concentration of ceric ions in the treatment solution is generally between 0.1 and 50 milligrams of ceric ions/l, and preferably between 2 and 20 milligrams of ceric ions/l.

The ceric ions are most conveniently introduced into the solution in the form of salts such as (preferably) the sulphate or nitrate.

The solutions of ceric ions used have a pH such that the ceric ions remain in the dissolved state, without combining to form a precipitate. The solutions are generally acid and this acid character is conveniently obtained by means of strong inorganic acids such as those from which the ceric salts employed have been produced (e.g., nitric acid and sulphuric acid). The acid concentration in the said ceric ion solutions is generally between 5 and 300 millimols of acid/l.

The temperature may be between 0° and 80° C and preferably between 20° and 50° C.

After immersion in the ceric ion solution, the membrane is dried in air and, if appropriate, is subjected to a heat treatment for the purpose of completing the action of the ceric ions.

This heat treatment may be carried out in air, for example at between 25° and 150° C, and preferably between 80° and 120° C, and for a period of from 15 minutes to 5 hours, and preferably between 1 and 2 hours. It may also be carried out by using a hot aqueous solution of ceric ions (temperatures below or up to 100° C are the most convenient to use).

The various polymers according to the present invention may either be shaped to give a membrane or they may form the active constituent of membranes. These membranes may be:

Simple membranes having ion exchange properties, which may be prepared in various ways, for example by hot pressing, by calendering, or by casting a solution of the polymer, and evaporation; or Composite membranes, where the polymer according to the invention is deposited in the form of a fine layer (generally 0.1 to 10μ) on a porous support (which may be an ultrafiltrating membrane); or Screen-reinforced membranes, the screen constituting from 20 to 80% by weight of the combination of screen + active constituent. A screen is a reinforcing support, for example a woven fabric, a non-woven fabric, a paper, a net, or a grid. These screen-reinforced membranes may be prepared by casting a solution of the polymer on the screen and evaporating the solvent; or Asymmetrical or anisotropic membranes posessing (a) a layer which is either dense or has pores of small diameter, this layer playing the role of a semi-permeable membrane and (b) a layer which is either porous or has pores of greater diameter than those of the preceding layer, this latter layer consisting of the same polymer as layer (a) and playing the role of a reinforcing support. Such membranes may be prepared by casting a solution of a polymer of the invention on a support and then coagulating one of the faces of the liquid film by a non-solvent for the polymer.

The ion exchange membranes and also the composite membranes and the asymmetrical membranes may also be screen-reinforced.

The membranes according to this invention may in particular be used in electrodialysis, in reverse osmosis, in ultrafiltration, and as a separator diaphragm for electrolysis cells, for example for the electrolysis of sodium chloride.

The polymers and membranes of the present invention are particularly advantageous in applications which employ basic media, bacause of the good resistance of the said polymers and membranes to those media.

In the text which follows various examples are given, but without implying any limitation, in order still better to illustrate the invention and to show how it may readily be put into practice.

In the examples, the properties of the ion exchange membranes are evaluated by the following tests and measurements:

(a) Electrical substitution resistance: the term electrical substitution resistance for a given membrane surface is applied to the variation in electrical resistance of a liquid vein, if the membrane is substituted for a layer of liquid of the same thickness and of the same surface area as the membrane, in a position at right angles to the axis of the vein. In the present case this substitution resistance is measured at 23° C in an aqueous 0.6 M solution and KCl and is expressed in ohm.cm².

(b) Permeation selectivity: This relates to the ability of the membrane to allow only the cations to pass, and to exclude the anions.

This permeation selectivity is deduced by calculation from the electromotive force E measured at 25° C between two aqueous solutions of KCl, respectively 0.4 M and 0.8 M, separated by the membrane in question which has beforehand been saturated with an 0.6 M aqueous solution of KCl.

The equation which gives the permeation selectivity in percent is:

$$\frac{p}{100} = \frac{\bar{t} - t}{1 - t}$$

in which $t$ is the transport number of the ion K⁺ and $\bar{t}$ is the transport number of this same ion in the membrane.

$\bar{t}$ is given by the equation $$\bar{t} = \frac{E + E_o}{2E_o}$$

in which $$E_o = \frac{RT}{F} \ln \frac{a_1}{a_2}$$

wherein
R = the gas constant
T = absolute temperature (corresponding to 25° C)
F = the Faraday constant (96.489 coulombs per gram equivalent)
$a_1$ = activity of the electrolyte in the more concentrated compartment ($a_1 = \gamma_1 C_1$ with $\gamma_1 = 0.620$ and $C_1 = 0.8$ M)
$a_2$ = activity of the electrolyte in the less concentrated compartment ($a_2 = \gamma_2 C_2$ with $\gamma_2 = 0.667$ and $C_2 = 0.4$ M).

(c) Bursting resistance: this is measured according to standard specification PN AFNOR Q 0314 which relates to tests on papers and boards. A membrane, fixed on a support frame which leaves a free surface area of 10 cm², is subjected to the action of a hydraulic pressure by means of a rubber membrane. The bursting pressure, that is to say the hydraulic pressure (in bars) at the instant of bursting is measured.

(d) Permeability to hydroxyl ions $P_{OH^-}$. This permeability represents the ability of the membrane to allow hydroxyl ions to pass, or to stop hydroxyl ions. Thus, in the case of the electrolysis of sodium chloride in aqueous solution, membranes are desired which stop hydroxyl ions to the greatest possible extent and which thus have a low value $P_{OH^-}$.

More precisely, this permeability $P_{OH^-}$ is measured in a two-compartment cell separated by the membrane tested. The compartments respectively containing an aqueous solution of sodium chloride of 5 mols/l and an aqueous solution of sodium hydroxide, of 5 mols/l. The concentration of OH⁻ (measured by acidimetry) is measured in each compartment over a period of time.

$$P_{OH^-} \text{ is equal to } \frac{V(C_{T+\Delta T} - C_T)}{S \cdot \Delta T \cdot 2.3 \overline{\Delta C}}$$

wherein
V is the volume of each compartment (in cm³),
S is the useful surface area in cm² of the membrane,
C is the concentration of OH⁻ in the compartment which initially contains sodium chloride,
$C_T$ is the concentration C at time T,
$C_{T+\Delta T}$ is the concentration C at time T + ΔT,
ΔT is an interval of time (in minutes),
$\overline{\Delta C}$ is the logarithmic mean of the concentration gradient between time T and time T + ΔT and is given by the equation:

$$\overline{\Delta C} = \frac{\Delta C_T - \Delta C_{T+\Delta T}}{\log \Delta C_T - \log \Delta C_{T+\Delta T}}$$

in which:
$\Delta C_T$ represents the difference in concentration of OH⁻ ions at time T between the two compartments,
$\Delta C_{T+\Delta T}$ represents the same difference at time T + ΔT, and
the logarithms are common logarithms.

The temperature at which the measurements are carried out is 23° C. Bearing in mind the way in which C varies, the value of $P_{OH^-}$ virtually does not depend on the time T or T + ΔT at which the measurements are carried out.

EXAMPLE 1

Preparation of the polymer

The following polymer is used as the phenoxy resin starting material:
Recurrent unit

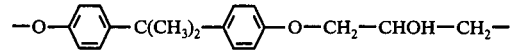

Reduced viscosity equal to 52 cm³/g (measurement carried out in dimethylformamide (DMF) at a concentration of 2 g/l).

10 g of this resin are dissolved in 400 cm³ of anhydrous dimethylsulphoxide (DMSO) at ambient temperature, under an atmosphere of dry nitrogen.

The following are then added, whilst stirring: 25.7 cm³ of a solution obtained by incorporating 1.35 mols of sodium hydride in DMSO, followed by a solution obtained by dissolving 4.27 g of propane-sultone in 10 cm³ of DMSO.

The mixture is heated to 50° C and is kept at this temperature, whilst stirring, for 16 hours. It is cooled and concentrated to 60° C under an absolute pressure of 1 mm Hg until its volume has been reduced to 4/5 of its initial value. The concentrated solution is poured into 4 liters of acetone at 15° C, which causes the formation of a precipitate, which is filtered off, washed twice with 1 l of acetone at a time, and dried under a stream of air for 1 hour at 25° C. It is then washed with 4 l of water and thereafter twice with 1 l of water at a time. It is again dried at 60° C under a reduced pressure of 100 mm Hg (absolute pressure).

6.15 g of a polymer containing 6.45% by weight of sulphur are thus obtained. The polymer (also called sulphopropylated phenoxy resin) consists of units of the formula:

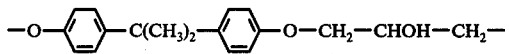

associated with units of the formula:

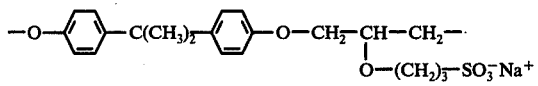

Preparation of a Membrane 1.2 of this polymer are dissolved in 30 cm³ of dimethylformamide (DMF) and the solution is cast on to a 12 × 20 cm glass plate and dried at 60° C under 200 mm Hg (absolute pressure) for 15 hours.

A 30 μ thick membrane is obtained, which has a permeation selectivity of 82%, a substitution resistance of 1.2 ohm.cm², and a bursting resistance of 2.2 bars.

EXAMPLE 2

Example 1 is repeated with the following modifications: 13.0 cm³ (in place of 25.7 cm³) of solution obtained by incorporating NaH into DMSO are used, and 2.2 g (in place of 4.27 g) or propane-sultone are used.

10.8 g of sulphopropylated resin having a sulphur content of 3.9% by weight are obtained.

The membrane prepared is also 30 μ thick, its permeation selectivity is 90%, its substitution resistance is 1 ohm.cm², and its bursting resistance is 2.2 bars.

This membrane is used in a reverse osmosis operation, to treat an aqueous solution containing 5 g/l of NaCl. This solution circulates at the upstream surface of the membrane at a flow rate of 45 l/hour under a differential pressure (difference between the pressures upstream and downstream from the membrane) of 100 bars; permeate is collected at a rate of 180 l/μ.day.m², that is to say 180 liters per day per unit surface area of membrane and per unit thickness of membrane. The degree of rejection of salt is 98%

(= 100 × $\frac{\text{concentration of the permeant} - \text{concentration of the permeate}}{\text{concentration of the permeant}}$).

A further sample of the membrane as prepared above is immersed in an aqueous 10 N sodium hydroxide solution at 90° C. The variation in the properties of the membrane as a function of time is observed; the following results are obtained:

| | Initial value | After 2 days | After 8 days | After 15 days |
|---|---|---|---|---|
| Permeation selectivity in % | 90 | 95 | 95 | 95 |
| Substitution resistance in ohm . cm² | 1 | 2 | 2 | 2.5 |
| Bursting resistance | 2.2 | 2.1 | 2.2 | 2.2 |

| | Initial value | After 2 days | After 8 days | After 15 days |
|---|---|---|---|---|
| in bars | | | | |

EXAMPLE 3

A membrane of sulphopropylated (or propylsulphonated) phenoxy resin, screen-reinforced by a polytetrafluoroethylene fabric, and crosslinked by a diepoxide, is prepared. The polytetrafluoroethylene fabric has a thickness of 0.18 mm and its texture is such that its permeability to air under a difference of pressure of 20 mm Hg is 3 m³/hour.m². This fabric is placed on a glass plate and over it is cast an 0.3 mm thick liquid film of a solution, containing the following, in methoxyethanol:

2% by weight of diepoxide of the formula (V) above wherein $q = 3$,

20% by weight of a sulphopropylated phenoxy resin containing 1.65 milliequivalents/g of sulphonic acid groups. More precisely, a polymer is used consisting of units of the formula:

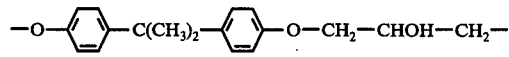

associated with units of the formula:

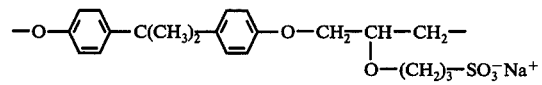

The membrane is dried under a stream of hot air at 60° C for 15 minutes and then under a reduced pressure of 50 mm Hg for 1 hour, the temperature again being 60° C.

The membrane is now immersed in water (10 minutes at 25° C) and then in an aqueous sodium hydroxide solution of strength 2 mols/l (1 hour at 25° C), the role of the latter being to catalyse the reaction of the epoxide groups with the hydroxyl groups. The membrane is then heated for 3 hours at 100° C in air.

After conditioning for 24 hours in an aqueous sodium hydroxide solution of strength 10 mols/l, this membrane has a permeability $P_{OH^-}$ of 37 × 10⁻⁴ cm/minute.

This membrane is immersed for 1 hour at 23° C in a stirred bath containing 3.6 milligram ions/l of Ce⁺⁺⁺⁺ in the form of the salt Ce(NO₃)₄.NH₄NO₃ and 30 millimols/l of HNO₃.

The membrane treated in this way is drained, dried for 1 hour in air at 110° C, and then immersed for 15 hours in water at ambient temperature. After conditioning for 24 hours in an aqueous sodium hydroxide solution of strength 10 mols/l, the permeability $P_{OH^-}$ is equal to 0.45 × 10⁻⁴ cm/min.

What is claimed is:

1. A polymer having ion exchange properties containing units of the formula:

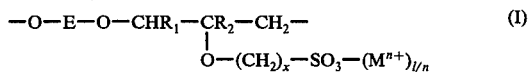

alone or in combination with units selected from the class consisting of units of the formula;

$$-O-E-O-CHR_1-CR_2-CH_2- \quad (II)$$
$$\phantom{-O-E-O-CHR_1-C}|$$
$$\phantom{-O-E-O-CHR_1-}OH$$

and units of the formula:

$$-O-E-O-CHR_1-CR_2-CH_2- \quad (IV)$$
$$\phantom{-O-E-O-CHR_1-C}|$$
$$\phantom{-O-E-O-CHR_1-C}R_4$$
$$-O-E-O-CHR_1-CR_2-CH_2-$$

in which:
$R_1$ and $R_2$, which may be identical or different, represent a hydrogen atom or a methyl radical;
$R_4$ represents a radical such as —O— or —O—$R_5$—O;
$R_5$ represents an organic radical of valency at least equal to 2;
E represents a divalent radical consisting of the nucleus system of a polynuclear diphenol in which the hydroxyl groups are attached to different nuclei;
$x$ and $n$ are positive integers; and
$M^{n+}$ represents a cation of valency $n$.

2. A polymer according to claim 1, in which the units of formula (I) are present in the polymer to the extent of from 0.5 to 3 milliequivalents per gram (meq/g) of dry resin.

3. A polymer according to claim 1, in which the units of formula (I) are present in the polymer to the extent of from 1 to 1.5 milliequivalents per gram (meq/g) of dry resin.

4. A polymer according to claim 1, in which E has the formula:

(III)

in which
Y and $Y_1$ are alkyl or alkoxy radicals having from 1 to 4 carbon atoms, or halogen atoms;
$R_3$ represents —CO—, —SO$_2$—, —O—, or —S—, or an alkylene or alkylidene radical having from 1 to 3 carbon atoms;
$m$ and $z$ may be equal to 0, 1, 2 or 3;
$M^{n+}$ represents H$^+$ or Na$^+$, K$^+$, Li$^+$, Mg$^{++}$, Ba$^{++}$, NH$_4^+$ or another ammonium cation; and
$x$ is between 2 and 5.

5. A polymer according to claim 5, in which —$R_5$— represents a —CH$_2$—CHOH—$R_6$—CHOH—CH$_2$ radical in which $R_6$ represents an aliphatic or aromatic or cycloaliphatic divalent radical or a mixed divalent radical of which the carbon chain contains from 2 to 100 carbon atoms and is optionally interrupted by functional groups, such as an oxygen atom.

6. A polymer according to claim 1, which is in the form of a membrane such as an ion exchange membrane, a composite membrane, a screen-reinforced membrane, or an anisotropic membrane.

7. A process for the preparation of a polymer according to claim 1, in which a sultone or a halogenoalkylsulphonic acid salt is reacted with a polymer consisting of units of the formula (II) as defined in claim 1.

8. A process according to claim 7, in which the reduced viscosity of the phenoxy resin polymer with units of formula (II) is between 15 and 120 cm$^3$/g.

9. A process according to claim 7, in which the sultone has the formula $$(CH_2)_x-SO_2$$
$$\phantom{(CH_2)_x}\diagdown\phantom{S}\diagup$$
$$\phantom{(CH_2)_xS}O$$

$x$ being an integer equal to or greater than 2, and in that the halogenoalkylsulphonic acid has the formula X—(CH$_2$)$_x$—SO$_3$H, X being a halogen atom and $x$ being a positive integer.

10. A process according to claim 9, wherein the halogen is chlorine or bromine.

11. A process according to claim 7, in which the alkylsulphonating agent is selected from the class consisting of propane-sultone, butane-sultone, pentane-sultone, and the salts of chloromethylsulphonic, bromomethylsulphonic, 2-chloroethylsulphonic, 2-bromoethylsulphonic, 3-chloropropylsulphonic and 3-bromopropylsulphonic acid.

12. A process according to claim 7, in which the temperature is less then 100° C, the concentration of polymer in the reaction mixture is between 0.5 and 20% by weight, and the alkylsulphonating agent is used in such an amount that the ratio of the number of mols of alkylsulphonating agent/units of the formula (II) present in the reactive copolymer starting material is between 0.05 and 5.

13. A process according to claim 12, wherein the temperature is between 30° and 70° C, the polymer concentration is between 1.5 and 5% by weight, alkylsulphonating agent/formula (II) units ratio is between 0.2 and 2.

14. A process according to claim 7, which is carried out in a solvent for the phenoxy resin and in the presence of a strong base.

15. A process according to claim 14, in which the solvent is an aprotic polar solvent and that the strong base is an alkali metal derivative of a compound having mobile hydrogen.

16. A process for the treatment of a membrane based on alkylsulphonated phenoxy resins according to claim 6, in which it is immersed in an acid solution containing ceric ions.

17. A process according to claim 16, in which the concentration of ceric ions in the solution is between 0.1 and 50 milligram ions/l.

18. A process according to claim 17, wherein the ceric ion concentration is between 2 and 20 milligram ions/l.

19. A process according to claim 16, in which the ceric ions are in the form of a salts.

20. A process according to claim 19, wherein the salt is a nitrate or sulphate.

21. A process according to claim 16, wherein the treatment solution contains nitric acid or sulphuric acid.

22. A process according to claim 16, in which the acid concentration of the solution is between 5 and 300 millimols/l.

23. A process according to claim 16, in which the membrane is screen-reinforced.

24. A process according to claim 16, in which the active polymer of the membrane contains units of the formula:

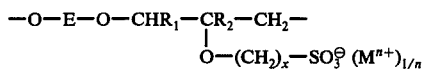 (I)

alone or in combination with units of the formula:

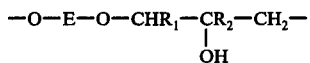 (II)

in which:

R$_1$ and R$_2$, which may be identical or different, represent a hydrogen atom or a methyl radical;

E represents a divalent radical consisting of the nucleus system of a polynuclear diphenol in which the hydroxyl groups are attached to different nuclei;

$x$ and $n$ are positive integers; and

M$^{n+}$ represents a cation of valency $n$.

25. A process according to claim 16, in which the polymer is crosslinked by means of a diepoxide.

26. A membrane which may be used especially in electrolysis cells and in reverse osmosis, which is obtained by a process according to claim 7, the membrane polymer containing from 0.5 to 3 milliequivalents per gram of dry resin of units of formula (I):

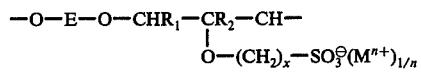

in which:

R$_1$ and R$_2$, which may be identical or different, represent a hydrogen atom or a methyl radical;

E represents a divalent radical consisting of the nucleus system of a polynuclear diphenol in which the hydroxyl groups are attached to different nuclei;

$x$ and $n$ are positive integers; and

M$^{n+}$ represents a cation of valency $n$.

27. A separator diaphragm for electrolysis cells comprising a membrane as defined in claim 6 containing from 0.5 to 3 milliequivalents per gram of dry resin of units of formula (I).

28. A reverse osmosis device having a membrane as defined in claim 6 containing from 0.5 to 3 milliequivalents per gram of dry resin of units of formula (I).

29. A polymer according to claim 1 in which R$_5$ represents

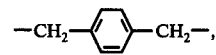

—(CH$_2$)$_p$—, —CH$_2$—CHOH—R$_6$—CHOH—CH$_2$— or —CH$_2$—CHOH—R$_6$—CH$_2$—, R$_6$ being a valency bond or

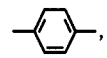

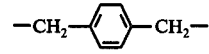

or —(CH$_2$)$_p$, $p$ being less than 10.

* * * * *